US006618386B1

(12) United States Patent
Liu et al.

(10) Patent No.: US 6,618,386 B1
(45) Date of Patent: Sep. 9, 2003

(54) HOSTING A CABLE MODEM IN A COMPUTER USING A VIRTUAL BRIDGE

(75) Inventors: Jun Liu, Redmond, WA (US); John M. Parchem, Seattle, WA (US); Daniel J. Shoff, Issaquah, WA (US); Soemin Tjong, Redmond, WA (US)

(73) Assignee: WEBTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/371,914

(22) Filed: Aug. 10, 1999

Related U.S. Application Data

(60) Provisional application No. 60/122,859, filed on Mar. 4, 1999.

(51) Int. Cl.$^7$ ............................................. H04L 12/66

(52) U.S. Cl. ..................... 370/401; 370/469; 370/487; 725/111

(58) Field of Search .............................. 370/401, 419, 370/420, 421, 428, 469, 486, 487, 490, 389; 725/51, 109, 111

(56) References Cited

U.S. PATENT DOCUMENTS

| 5,809,252 | A | * | 9/1998 | Beighe et al. ............... 709/227 |
| 6,058,421 | A | * | 5/2000 | Fijolek et al. ............... 709/225 |
| 6,236,653 | B1 | * | 5/2001 | Dalton et al. ................ 370/352 |
| 6,370,147 | B1 | * | 4/2002 | Beser ........................... 370/401 |
| 6,452,923 | B1 | * | 9/2002 | Gerszberg et al. ........... 370/352 |
| 6,466,986 | B1 | * | 10/2002 | Sawyer et al. ............... 709/245 |
| 6,484,210 | B1 | * | 11/2002 | Adriano et al. .............. 709/239 |

OTHER PUBLICATIONS

Cerf, V., "The Catenet Model for Internetworking," Information Processing Techniques Office, Defense Advanced Research Projects Agency, IEN 48, Jul. 1978.

Bolt Beranek and Newman, "Specification for the Interconnection of a Host and an IMP," BBN Technical Report 1822, Revised May 1978.

Postel, J., "Internet Control Message Protocol—DARPA Internet Program Protocol Specification," RFC 792, USC/Information Sciences Institute, Sep. 1981.

Shoch, J., "Inter–Network Naming, Addressing, and Routing," COMPCON, IEEE Computer Society, Fall 1978.

Postel, J., "Address Mappings", RFC 796, USC/Information Sciences Institute, Sep. 1981.

Shoch, J., "Packet Fragmentation in Inter–Network Protocols," Computer Networks, v. 3, n. 1, Feb. 1979.

Strazisar, V., "How to Build a Gateway," IEN 109, Bolt Beranek and Newman, Aug. 1979.

Postel, J., "Service Mappings," RFC 795, USC/Information Sciences Institute, Sep. 1981.

Postel, J., "Assigned Numbers," RFC 790, USC/Information Sciences Institute, Sep. 1981.

(List continued on next page.)

*Primary Examiner*—Min Jung
(74) *Attorney, Agent, or Firm*—Workman, Nydegger & Seeley

(57) ABSTRACT

A computer system that hosts a cable modem is described. The cable modem may be used to send and receive messages over the Internet using a cable network managed by a cable operator. Unlike external modems, the cable modem uses the same CPU and memory that are used by the computer system's operating system. However, the cable modem has a different network address than the computer system. When the cable modem receives a data packet having the network address of the cable modem, a cable modem driver forwards the packet to a protocol stack for the cable modem. When the cable modem receives a data packet having the network address of the computer system, the packet is forwarded to a different protocol stack for the computer system. Since the protocol stacks of the cable modem and computer system are different, direct communication from the computer system to the cable modem is not permitted.

15 Claims, 5 Drawing Sheets

OTHER PUBLICATIONS

"MCNS Data–Over–Cable Service Interface Specifications: Baseline Privacy Interface Specification SP–B-PI–I02–990319", Mar. 1999.

"MCNS Data–Over–Cable Service Interface Specifications: Cable Modem to Customer Premise Equipment Interface Specification SP–CMCI–I04–000714", Jul. 2000.

"Data–Over–Cable Service Interface Specifications: Cable Modem Termination System—Network Side Interface Specification, SP–CMTS–NSII01–960702", Jul. 1996.

Ciciora, W., et al., "Protocol Issues," *Modern Cable Television Technology: Video, Voice, and Data Communications*, Section 4.4, pp. 194–205, Copyright 1999 by Morgan Kaufmann Publishers, Inc.

Ciciora, W., et al, "Chapter 4.5: The DOCSIS Protocol for Cable Modems," *Modern Cable Television Technology: Video, Voice, and Data Communications*, Section 4.5, pp. 205–213, Copyright 1999 by Morgan Kaufmann Publishers, Inc.

* cited by examiner

HOSTING A CABLE MODEM IN A COMPUTER USING A VIRTUAL BRIDGE

RELATED APPLICATIONS

This application claims the benefit of U.S. Provisional Application No. 60/122,859, filed Mar. 4, 1999, which is incorporated herein by reference in its entirety.

BACKGROUND OF THE INVENTION

1. The Field of the Invention

The present invention relates to electrical computers and data processing systems. Specifically, the present invention relates to a virtual bridge for enabling a cable modem to be self-hosted by a computer, a set-top box, or the like.

2. The Prior State of the Art

The Internet is a worldwide interconnection of networks over which computers can exchange information. Never before have human beings had access to so much information from the comfort of their own homes or offices. For Wide Area Networks (WANs) such as the Internet, a computer typically employs a modem to send information to and receive information from other connected computers. There are many types of modems each corresponding to a specific type of medium used to deliver this information.

One common modem uses Plain Old Telephone Service (POTS) to send and receive information. POTS modems have an advantage in that they use a transmission medium that is available by just connecting the modem with the nearest phone jack. Thus, the POTS modem does not require expensive capital investment to set up a connection to the Internet. Although POTS modems are easy and inexpensive to connect to the Internet, the transmission speeds available over plain old telephone service are relatively slow. Currently, POTS modems are capable of information exchange at up to only 56,000 bits per second (bps) or approximately 0.056 megabits per second (Mbps). While faster POTS modems may eventually become available, it is not currently anticipated that POTS modems can become significantly faster due to physical limitations in the telephone lines themselves.

Telephone companies are now offering services that bypass the relatively slow telephone lines to establish a more direct connection to the Internet. For example, T1, connections permit information exchange in the megabits per second (Mbps) range. T2 and T3 connections allow for even higher speed information exchange. Currently, T1, T2 and T3 connections respectively permit information exchange at approximately 1.544 Mbps, 6.312 Mbps and 44.736 Mbps. Although these direct T1, T2 and T3 connections permit information exchange orders of magnitude faster than is available over plain old telephone service, they are typically much more expensive to obtain and/or maintain than plain old telephone service since each connection requires dedicated circuitry. Furthermore, telephone companies typically provide both the plain old telephone service and the T1, T2 and T3 connections. To facilitate free market competition, it would be desirable for a consumer to have alternative suppliers of Internet access.

A cable modem is a device that hooks up to the Internet through a cable system provided by a cable operator. Assuming that the cable operator facilitates Internet access as many cable operators do, Internet access is obtained by plugging the cable modem into a cable connection that typically already exist (or may be readily installed) in many homes and business. Thus, the cost of connecting a cable modem to the Internet is relatively small compared to establishing T1, T2 and T3 connections since the extensive cable network that supports communication already exists. Thus, there is no need to establish extensive dedicated circuitry to support each new end user.

Furthermore, dialing into the Internet is not needed since data may be communicated to or from the end-user over the cable system without dialing into the cable system. Thus, the initial connection to the Internet is much faster compared to using plain old telephone service.

In addition, cable modems allow for much faster information exchange than is available over plain old telephone service. An individual cable modem end user may experience information exchange speeds of from 0.5 Mbps to 1.0 Mbps or more depending on the cable network architecture and traffic load. This represents a speed that is at least an order of magnitude faster than is currently available over plain old telephone service. Furthermore, cable information exchange speeds may be further increased due to future improvements in cable technology. Thus, cable modems provide a low cost, high-speed alternative for Internet access.

In a typical cable modem configuration, the cable modem is external to and separately addressable from the end user's computer system. The end user's computer is then connected to the cable modem using, for example, a network card. One reason for which the cable modem is external to the end-user's computer is that the cable modem may have access control settings that are to be set by the cable operator, not by the end-user. For example, the cable operator may want to prohibit access to certain services unless the end-user has communicated a subscription to the cable indicating a willingness to abide by certain terms. Allowing the end-user to directly access and set these access control settings would bypass the very purpose for having the access control settings. Thus, having the cable modem be external to the end-user's computer has the advantage of the cable supplier retaining control of the access control settings within the cable modem.

From the standpoint of the computer, the cable modem is a bridge that allows the computer to communicate with other network components and to receive network resources. The cable modem acts as a bridge by transferring IEEE 802.3 Ethernet data packets, for example, to the computer.

As the cable modem is external, the cable modem does not use the processing capability of the central processing unit (CPU) of the end user's computer system. Also, the cable modem does not share memory with the end user's computer. Thus, the cable modem has its own CPU and memory which increases the cost of the cable modem.

Furthermore, the introduction of an external cable modem adds a degree of complexity to the set up of the computer system. For example, the computer user must do more than just directly connect the computer system to the cable network to have Internet access. The user must connect the cable modem to the cable network, then connect the computer system to the cable modem.

Thus, what is desired is a computer system that provides Internet access through a cable modem. Furthermore, it is desired is that the cable modem not require its own dedicated CPU and/or memory. Also, it is desired that the cable modem be easier to set up than conventional external cable modems. In addition, it is desired that the access control settings of the cable modem not be directly accessible and changeable by the end-user.

SUMMARY OF THE INVENTION

In accordance with the present invention, a computer system hosts a cable modem which can be connected to an extensive cable network managed by a cable operator. While cable operators have traditionally offered only television programming over these cable networks, cable operators have recently begun offering Internet service as well. The cable modem of the present invention may communicate over the Internet using these cable networks with the cooperation of the cable operators.

Typically, cable modems for use with the Internet are "external" in that the cable modem exists as a separate device from the computer system. The external cable modem connects directly to the cable network and bridges the cable network to the computer system using a medium such as an Ethernet or a universal serial bus.

In the present invention, the cable modem not external, but is integrated within and hosted by the computer system. Specifically, the cable modem uses the same CPU and memory that are used by the operating system of the computer system. Since a separate CPU and memory are not required for the cable modem, the cost of the combined cable modem and computer system is reduced.

Even though the cable modem is hosted by the computer system, the cable modem has a different network address than the other components in the computer system. When the cable modem receives a data packet having the network address of the cable modem, a cable modem driver forwards the packet to a cable modem protocol stack that enables data to be communicated to and from the cable modem. When the cable modem receives a data packet having the network address of the computer system, the packet is forwarded through a bridging component to another protocol stack that enables communication to and from the operating system of the computer system.

Furthermore, the computer system may be connected to other customer premises equipment as well. If the packet has an network address indicating one of the customer premises equipment, the packet is passed over the bridging component to an appropriate interface card (e.g., an Ethernet card) and over an appropriate medium (e.g., an Ethernet) to the identified customer premise equipment. The customer premise equipment has its own protocol stack that processes the packet. Thus, the computer system may act as a local server for all of the customer premise equipment, using a single, self-hosted cable modem to establish communication with the Internet.

Since the cable modem has its own communication protocol stack that is separate from the communications protocol stacks of the computer system and the customer premises equipment, direct communication from the other components to the cable modem is not permitted. Thus, an end-user at the computer system or at one of the customer premises equipment cannot directly change access control settings of the cable modem. Only the cable operator can change such settings. Thus, if an end-user desires to obtain access to a service previously denied the end-user, the end-user must coordinate with the cable operator to gain access to the service. Thus, the cable operators can regulate the end-user's access to Internet services.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
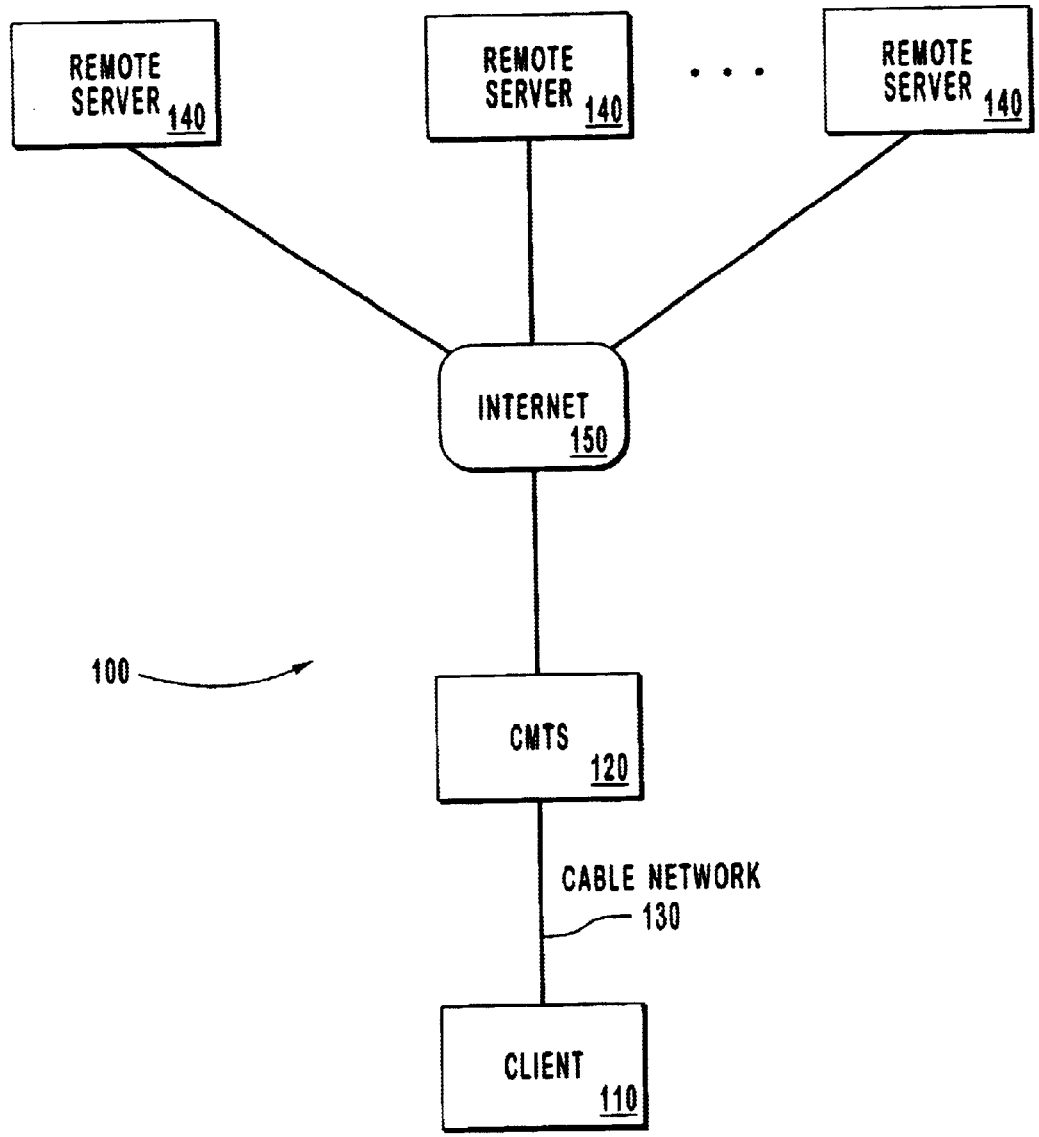
FIG. 1 is a schematic drawing of a network system that provides a suitable operating environment for the present invention.

The present invention relates to systems and methods for self-hosting a cable modem within a computer system such as a set top box or other equivalent electronic device having an operating system. The cable modem shares the CPU and memory of the computer system with the operating system. Since the cable modem does not have its own dedicated CPU and memory, the cable modem can be simplified.

Even though the cable modem is hosted by the computer system, the cable modem has a different network address than the hosting computer system. Furthermore, the communications for the cable modem and for the computer system are handled by different communication protocol stacks. Specifically, data packets having the network address of the cable modem are passed up through a cable modem protocol stack which enables communication to and from the cable modem. Data packets having the network address of the computer system are passed up through a separate protocol stack that enables communication to and from the computer system. Data packets having the network address of other locally connected customer premises equipment are routed through the computer system to the appropriate customer premises equipment where it is passed through an appropriate protocol stack for interpretation.

Data packets that are forwarded from the cable modem driver to the protocol stacks of the host computer or of items of customer premises equipment that are networked with the host computer pass through a software bridging component. The bridging component can be characterized as a virtual bridge that appears, from the standpoint of the operating system or the protocol stack of the host computer to be an external cable modem. As noted previously, external cable modems are analogous to actual bridges that enable computers to communicate with other network components. The bridging component of the present invention is a virtual bridge in the sense that it is not an actual, hardware-implemented bridge as are external cable modems.

Thus, even though the cable modem is hosted by the computer system, the computer system cannot control access control settings within the cable modem since the computer system's protocol stack cannot send a message through the cable modem's protocol stack. Furthermore, the connected customer premises equipment also cannot control the cable modem access control settings for the same reason. Only the cable operator has control over the access control settings of the cable modem. Thus, the cable system end-user must have the cooperation of the cable operator to access cable services.

In the following description, for clarity, numerous specific details are set forth in order to provide a thorough understanding of the invention. However, it will be evident to one skilled in the art that the present invention may be practiced without these specific details. In other instances, well-known structures and devices are shown in block diagram form in order to avoid obscuring the present invention.

Embodiments within the scope of the present invention include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general-purpose computer, special purpose computer, or special purpose processing device to perform a certain function or group of functions.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps and acts of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communications network. In a distributed computing environment, program modules may be located in both local and remote memory storage devices.

FIG. 1 illustrates a configuration of a wide area network 100 that provides a suitable operating environment for the present invention. A client 110 is coupled to a Cable Modem Termination System (CMTS) 120 via a cable network 130. The cable network 130 is a distributed network that cable operators typically have used to provide television programming to customers. The CMTS 120 is also maintained by the cable operators and functions to communicate with a number of remote servers 140 (e.g., conventional Web servers) over a conventional network infrastructure, such as the Internet 150. This conventional infrastructure may also be a local-area network or a wide-area networks other than the Internet. For example, a local-area network might include a local cable network.

Outgoing messages may be communicated by the client 110 over the cable network 130 to the CMTS 120. The CMTS 120 forwards the outgoing message over the Internet 150 to an appropriate remote server 140. In response, the remote server 140 generates an incoming message and transmits the incoming message over the Internet 150 to the CMTS 120. The CMTS 120 then uses the cable network 130 to forward the incoming message to the client 110. In this description and in the claims, "outgoing" means in a direction from the client 110 to the remote servers 140, and "incoming" means in a direction from the remote servers 140 to the client 110.

Figure 2:
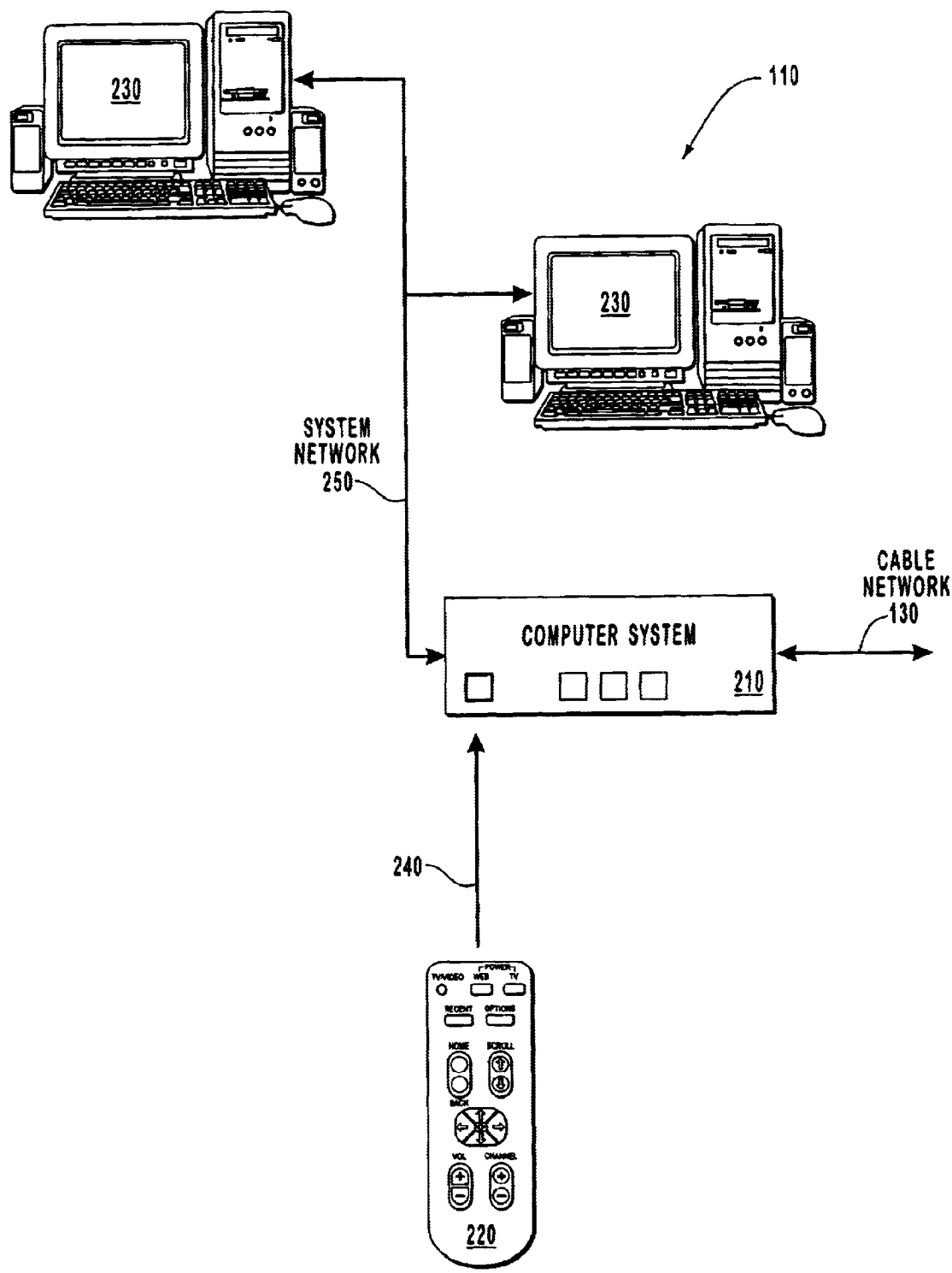
FIG. 2 is a schematic drawing of a client of FIG. 1 in which the present invention can be implemented.

FIG. 2 illustrates the client 110 of FIG. 1 in which embodiments of the present invention may be implemented. The client 110 includes a computer system 210, an input device 220, and one or more items of Customer Premises Equipment (CPE) 230.

The computer system 210 may be a set top box, a personal computer, a workstation, a network computer, or any other special purpose or general purpose computer system capable of performing the steps and acts of the present invention.

The input device 220 may be any device capable of generating control information and passing that information to the computer system 210 over an input link 240. For example, the input device 220 may be a keyboard, a mouse, a joystick, a remote control, or the like. If the input device 220 is a remote control, for example, the input link 240 would be an InfraRed (IR) link. The input device 220 may also be integrated with the computer system 210 as desired.

The computer system 210 is connected to one or more items of customer premises equipment 230. In this description and in the claims, "customer premises equipment" means electronic equipment capable of receiving electronic messages from the computer system 210. For example, the customer premises equipment 230 may include personal computers, television sets, set-top boxes, workstations, network computers, or other electronic equipment.

In operation, the computer system 210 sends information to and receives information from the CMTS 120 over the cable network 130 using a standard such as the well-known Data Over Cable Service Interface Specification (DOCSIS) 1.0 standard. This DOCSIS standard is managed by the Multimedia Cable Network System (MCNS), an organization formed by major cable operators.

For incoming data from the cable network 130, depending on the network address provided with the incoming data, the computer system 210 either consumes the data itself, or passes the data to one or more of the items of customer premises equipment 230 over a system network 250. Although only one system network 250 is shown, the computer system 210 may use multiple system networks to communicate with customer premises equipment 230. For example, the system network 250 may be any medium capable of communicating information to and from the computer system 210 including one or more of an Ethernet, a Universal Serial Bus (USB), a fire wire (i.e. the IEEE 1394 standard), or any other equivalent medium.

For outgoing data to the cable network 130, the computer system 210 uploads data onto the cable network 130. The outgoing data was either generated internal to the computer system 210 or was received over the system network 250 from one of the items of customer premises equipment 230.

Figure 3:
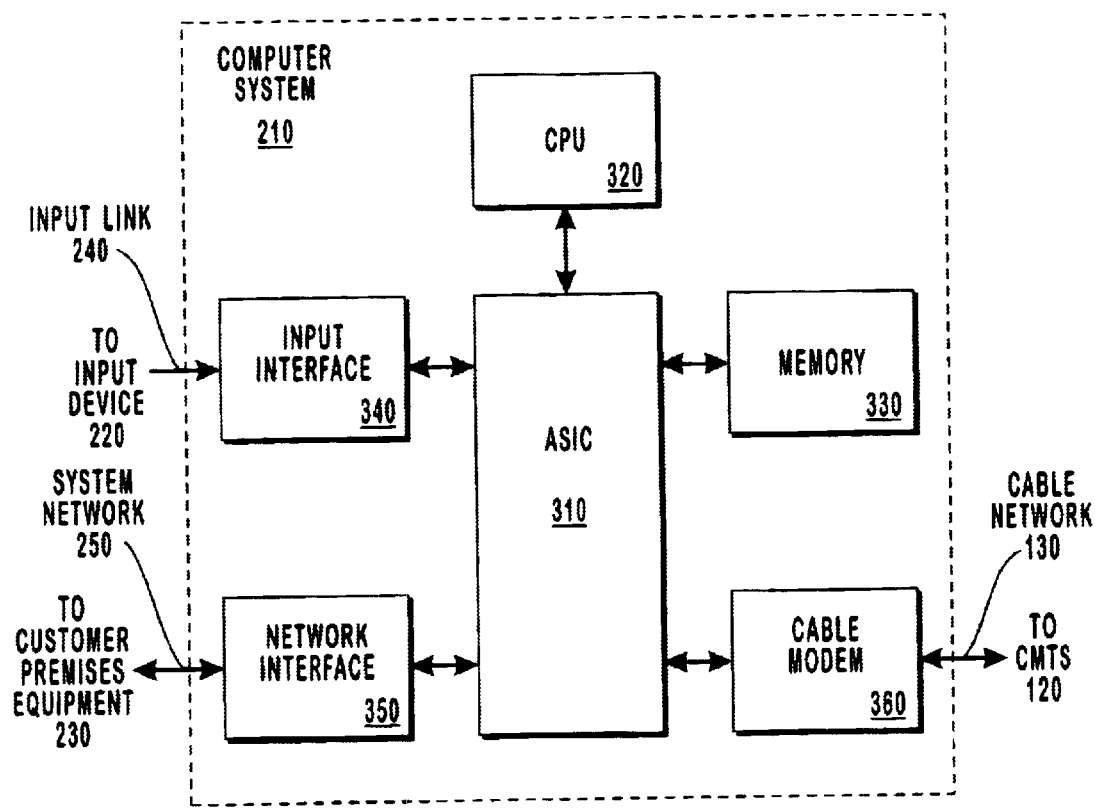
FIG. 3 is a schematic drawing of the physical internal components of the computer system of FIG. 2.

FIG. 3 shows the internal hardware components of the computer system 210 according to one embodiment of the invention. Operation of the computer system 210 is controlled by a Central Processing Unit (CPU) 320, which is coupled to an Application-Specific Integrated Circuit (ASIC) 310. The CPU 320 executes software designed to implement features of the present invention.

The software may be in the form of computer-executable instructions stored on a memory 330 writable and readable by the ASIC 310 and/or CPU 320. For example, the memory 330 may include one or more of a Random Access Memory (RAM), a Read-Only Memory (ROM), or any other circuit capable of reading and writing information to the ASIC 310 and/or the CPU 320.

An input interface 340 receives the control signals provided by the input device 220 over the input link 240. For example, if the input device 220 is a remote control, the input interface 340 is an IR interface.

Data from the system network 250 is provided to the computer system 210 via a network interface 350. Similarly, information from the computer system 210 is provided to the system network 250 over the network interface 350. The type of network interface 350 depends on the type of system network 250. For example, if the system network 250 is an Ethernet, the network interface 350 is an Ethernet card.

The data is received from and transmitted to the cable network 130 using a cable modem 360. The cable modem 360 can be compatible with the standard used to transmit data over the cable link such as the DOCSIS 1.0 standard.

The physical communication components of the computer system 210 thus include the input interface 340, the network interface 350, and the cable modem 360 which perform layer 1 functions of the well known Open System Interconnection (OSI) standard. The OSI standard defines a framework for controlling communication in seven layers. After receiving a physical signal, the resulting data is passed from layer 1 (the physical layer) up to higher layers for processing. To transmit a signal, the data generated or processed by the higher layers are passed to layer 1 for conversion of the data into a physical signal. These higher layers of the OSI model are performed by the ASIC 310 and CPU 320 in executing programs, modules, or instructions residing within the memory 330. The implementation of these higher layers is described in more detail herein. The stack of protocol layers through which data travels is called a "protocol stack" in this description and in the claims.

Figure 4:
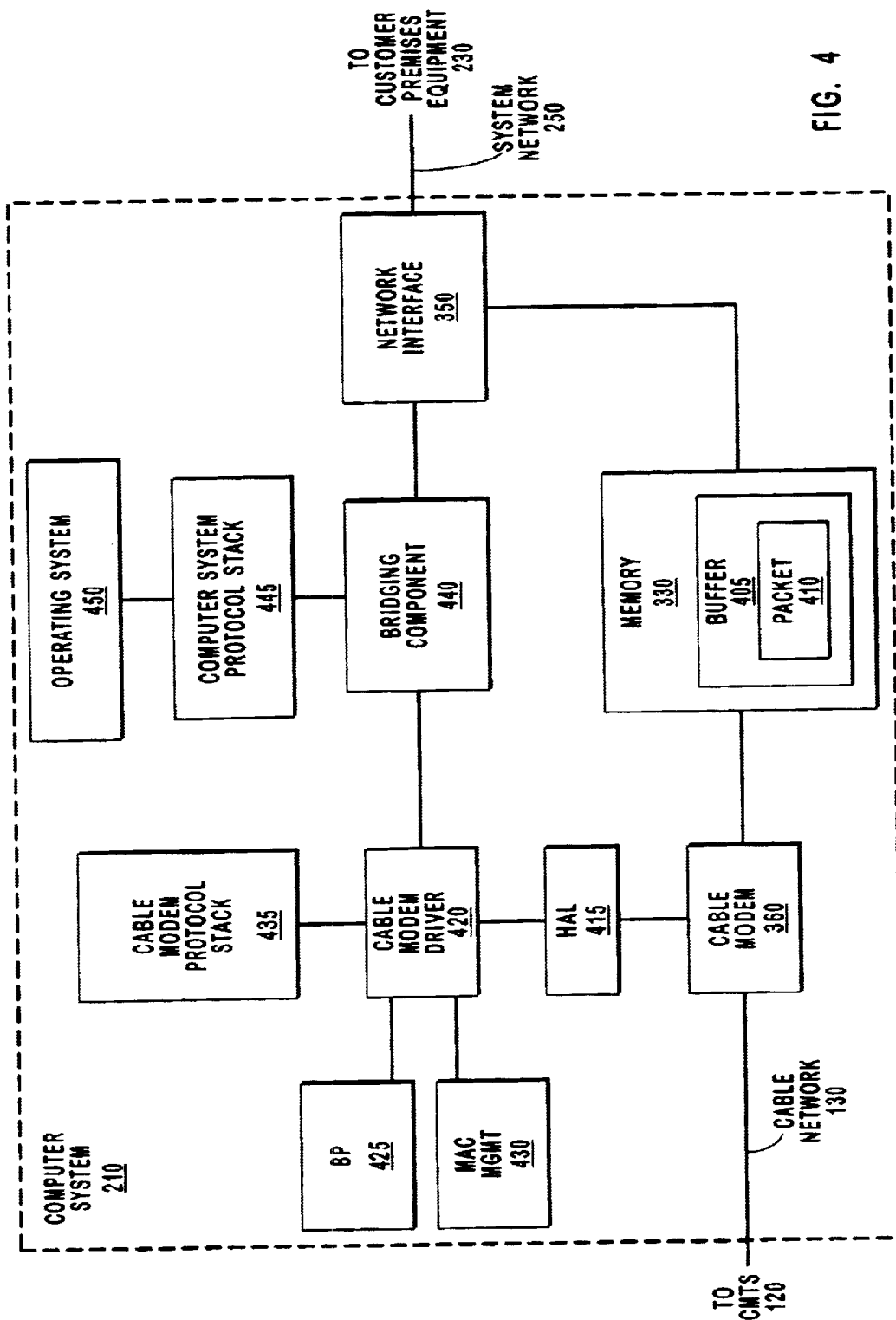
FIG. 4 is a schematic drawing of the physical and software communication components of the computer system of FIG. 2 and FIG. 3 in accordance with the present invention.

FIG. 4 is a schematic diagram of the communication components of the computer system 210 of FIG. 2. The memory 330, the network interface 350, and the cable modem 360 may be implemented in hardware and represent the physical layer (layer 1) of the OSI model. The Hardware Abstraction Layer (HAL) 415, the cable modem driver 420, the Baseline Privacy (BP) unit 425, the Media Access Control (MAC) Management unit 430, the cable modem protocol stack 435, the bridging component 440, the computer system protocol stack 445, and the operating system 450 will be described as being executed as software modules. However, one skilled in the art will recognize that these units may be implemented in hardware, or by a combination of software and hardware. The baseline privacy unit 425 provides user data privacy and protection from theft of service. The MAC management unit 430 is used for routing incoming and outgoing data packets according to the source and destination addresses associated with the data packets.

Figure 5:
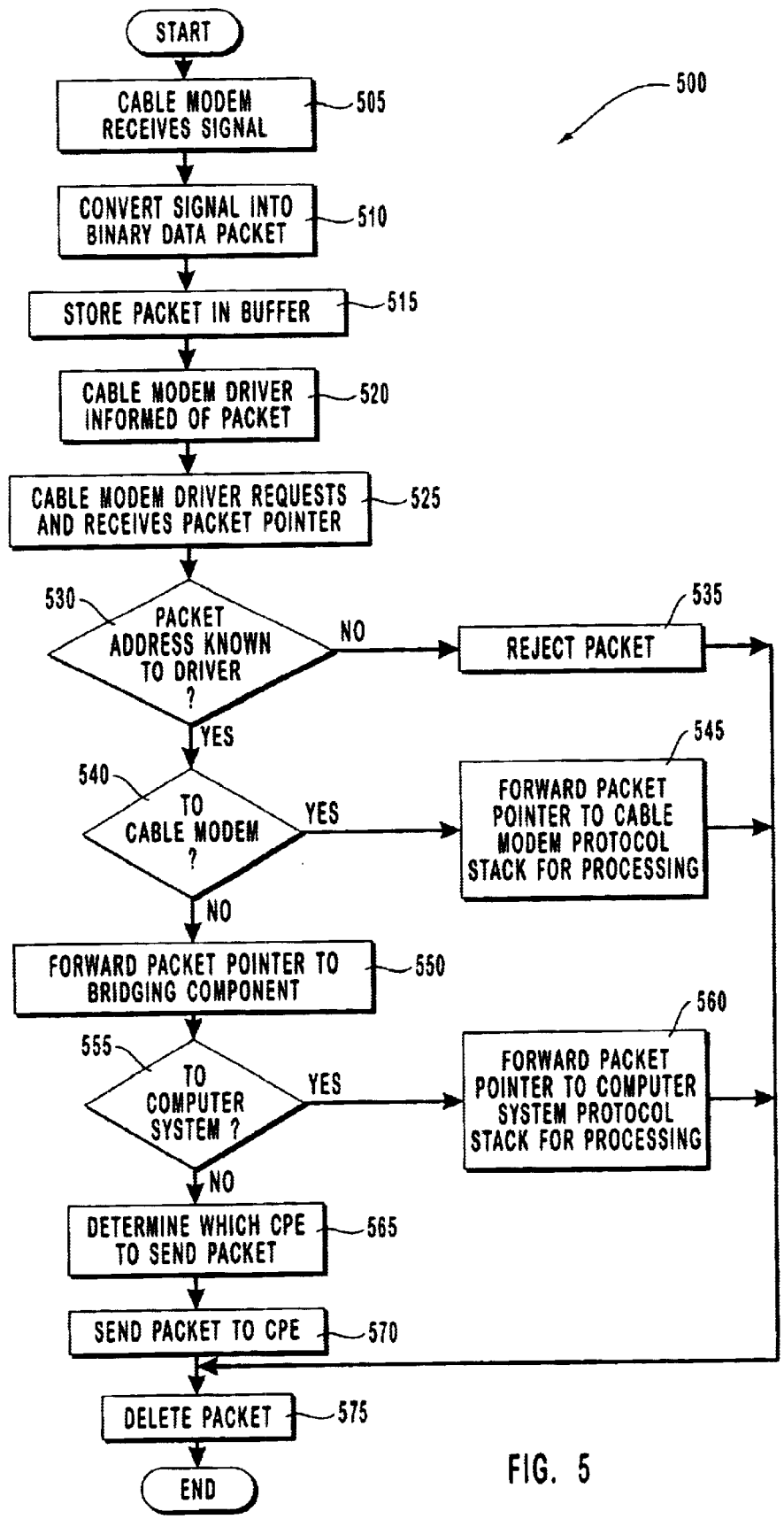
FIG. 5 is a flowchart showing a method for processing an incoming signal from the cable network using the computer system of FIG. 4.

The structure of the computer system 210 may best be understood by describing how the computer system 210 processes incoming and outgoing data. FIG. 5 is a flowchart for a method 500 of processing incoming data. The method of FIG. 5 will be described with frequent reference to the structure shown in FIG. 4.

First, incoming data in the form of a physical signal is received by the cable modem 360 (step 505) from the cable network 130. This incoming data may be routed to the cable modem protocol stack 435, the computer system protocol stack 445, or to an item of customer premises equipment 230 via the network interface 350. As described herein, this incoming information is compliant with a standard such the well known DOCSIS 1.0 standard. The data may typically be packetized and include headers identifying the source and destination address of the information. For the incoming information, the destination device may be uniquely identified using a 48-bit IEEE MAC address.

The cable modem 360 converts the physical signal into a binary data packet 410 (step 510) for potential further processing by the computer system 210. This packet 410 may be physically passed from one memory location to another as it is routed through the computer system 210. However, in one embodiment, the packet 410 is stored in a buffer 405 (step 515) located in the memory 330 while a pointer to the buffer 405 is passed from one module to the next. Passing the much smaller pointer instead of the entire packet 410 reduces the processing load on the CPU 320. In a sense, by passing the pointer, the packet 410 is being passed from one module to the next in that access to the packet 410 is being passed from one module to the next.

The cable modem Hardware Abstraction Layer (HAL) 415 is a standardized interface between the cable modem 360 and the cable modem driver 420 allowing flexibility in the choice of the cable modem 360 used with the computer system 210. The only requirement of the cable modem 360 is that it interact properly with the hardware abstraction layer 415. The cable modem 360 can perform its own internal functions in any way selected by the designer or manufacturer of the cable modem.

Another advantage of the hardware abstraction layer 415 is that it can act as a COM interface. COM is a well-known specification for interfacing software modules. For example, a software application may have a need to perform a specific function offered by a software module. Instead of performing the function itself, an application interface calls the software module to perform the function. COM defines the way that the software application dynamically (i.e., as the application is running) interfaces with the software module to allow the software application access to the service provided by the module. As long as there is, a standard for the way the application interfaces with the module and the service is provided, it does not matter to the application how the module provides the service. Similarly, it does not matter to the software module what other services the application software offers. In this sense, the software module is "encapsulated".

Thus, the hardware abstraction layer 415 hides the detailed implementation of the cable modem 360 thus protecting sensitive or proprietary information that the cable modem provider wishes to keep confidential. Similarly, the sensitive information in the computer system 210 is protected from access by the cable modem 360. A hardware abstraction layer for use with the present invention is described in commonly-owned, co-pending U.S. patent application Ser. No. 09/371,915 entitled "Interface for Abstracting Control of a Cable Modem," filed on the same date as the present application, which is incorporated herein by reference in its entirety. A hardware abstraction layer for use with the present invention is also described in commonly-owned, co-pending U.S. patent application Ser. No. 09/371,419, entitled "Application Program Interface for Abstracting Control of a Cable Modem" also filed on the same date as the present application, which is incorporated herein by reference in its entirety.

The hardware abstraction layer 415 detects when the packet 410 has been received by the cable modem 360 and informs the cable modem driver 420 about the packet 410 (step 520). The cable modem driver 420 then requests and receives the pointer for the packet 410 from the hardware abstraction layer 415 (step 525).

When an incoming data packet is received by cable modem driver 420, the MAC management unit 430 determines whether the destination network address provided in the packet 410 matches any of the network addresses of the cable modem 360, the computer system 210, or any of the items of customer premises equipment 230 (decision block 530). If not (NO in decision block 530), the cable modem driver 420 rejects or takes no further action with respect to the packet 410 (step 535) and the packet 410 is deleted from the memory 330 (step 575).

If there is an address match (YES in decision block 530), the cable modem driver 420 then determines whether the destination network address corresponds to the cable modem 360 (decision block 540). If the destination of the packet 410 is the cable modem 360 (YES in decision block 540), the cable modem driver 420 forwards the pointer to the cable modem protocol stack 435 (step 545). The cable modem protocol stack 435 performs functions at layers 3, 4, 5, 6, and 7 of the OSI model. Specifically, the cable modem protocol stack 435 reassembles all data packets that relate to a common message to reassemble the message that was packetized for transmission.

The cable modem protocol stack 435 validates the reassembled message to determine if it has been accurately received. The message is decrypted, decompressed or reformatted, if necessary, and passed to systems which control the cable modem 360. An appropriate cable modem protocol stack 435 can include an IP protocol driver, an ARP protocol driver, an ICMP protocol driver, a DHCP protocol driver, a TFTP protocol driver, a TOD protocol driver, and an SNMP protocol driver. A message might be transmitted from the cable operator over the cable network 130 to the cable modem 360 to regulate access control settings in the cable modem 360. After the packet 410 has been processed in the cable modem protocol stack 435, the cable modem driver 420 deletes the packet 410 from the buffer 405 (step 575).

If the destination network address of the packet 410 is not for the cable modem protocol stack 435 (NO in decision block 540), then the destination network address corresponds to a component on the other side of the bridging component 440. Thus, the pointer to the packet 410 is passed to the bridging component 440 (step 550). The remaining candidates for the packet destination are the computer system 210 (specifically, the operating system 450) or one of the items of customer premises equipment 230.

The bridging component 440 reviews the destination network address of the packet 410 to determine whether the computer system 210 is the destination (decision block 555). If so (YES in decision block 555), the pointer is passed to the computer system protocol stack 445 (step 560) for processing by the operating system 450.

The computer system protocol stack 445 reassembles the packet 410 with other related packets to form a message and processes the message in accordance with the OSI model. In one embodiment, the operating system 450 is a Windows® CE operating environment. In this case, an appropriate computer system protocol stack 445 would use the Virtual MCNS Miniport Driver, and a Network Device Interface Standard ("NDIS") driver to move data up through the TCP/IP protocols to eventually interface with Windows® CE through a Winsock interface.

NDIS is a device driver interface that allows multiple network protocols to be supported by a single network card or network connection. According to the embodiment of the invention the implements the bridging component in the NDIS context, NDIS enable a single cable modem and the associated cable modem driver to operate with any number of protocol stacks. The NDIS implementation of the invention further presents standardized interface to which the bridging software and the protocol stacks can be written. General features and operation of NDIS will be understood by those of skill in the art. NDIS is further described in U.S. patent application Ser. No. 09/302,735, filed Apr. 30, 1999, which is incorporated herein by reference.

After the packet 410 is processed by the operating system 450, the packet 410 is deleted from the buffer 405 (step 575). If the packet 410 is not intended for the operating system 450 (NO in decision block 555), the bridging component 440 determines which of the customer premises equipment 230 is to receive the packet 410 (step 565). The bridging component 440 then has the network interface 350 read the packet 410 from the buffer 405 for transmission to the appropriate item of customer premises equipment 230 (step 570) for processing. The customer premises equipment 230 also have protocol stacks (not shown, for processing the packet 410. After processing is complete, the packet 410 is deleted from the buffer 405 (step 575). Thus, the method 500 is completed.

It is notable that messages intended to control the cable modem 360 use the cable modem protocol stack 435, while messages intended for the operating system 450 or one of the items of customer premises equipment 230 use a separate protocol stack. This configuration prohibits the operating system 450 or customer premises equipment 230 from sending messages directly to the cable modem protocol stack 435 for controlling the cable modem 360. Instead, if the end-user desires to change access privileges for a cable service, the end-user must first send a message to the cable operator indicating such a desire. If the end-user complies with all preconditions for allowing the additional service, the cable operator may then send a message directly to the cable modem protocol stack 435 to reconfigure the cable modem 360 to allow for the additional service.

Although each destination (i.e., the cable modem protocol stack 435, the operating system 450, or the customer premises equipment 230) is described as having a single unique network address, these destinations may have multiple unique network addresses to support multicast functionality. For example, one of the items of customer premises equipment 230 might be allocated an additional network address when it joins a newsgroup. This multicast network address will be shared by the customer premises equipment 230 with all other devices distributed throughout the cable network 130 that are also part of the newsgroup.

Outgoing messages may also be transmitted from the computer system 210 or customer premises equipment 230 over the cable network 130 to the CMTS 120. Such a method is described in commonly-owned, U.S. patent application Ser. No. 09/371,916, entitled "Automatic Compiling of Address Filter Information Associated with Cable Modem," filed on the same date as the present application, which is incorporated by reference herein in its entirety.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer system that is configured to host a cable modem for receiving data packets over a cable network and to connect with customer premises equipment through a system network, the computer system comprising:
    an operating system having a first network address;
    a computer system protocol stack for enabling data to be communicated to and from the operating system of the computer system;
    having a second network address that is different from the first network address;
    a cable modem protocol stack for enabling data to be communicated to and from the cable modem;
    a CPU that is utilized by both the operating system and the cable modem; and
    a cable modem driver that is confined to forward data packets that are received by the cable modem from the cable network to one of the cable modem protocol stack and a bridging component based upon network addresses of the data packets and
    wherein the bridging component is configured to direct any data packets that are received from the cable modem driver to one of the computer system protocol stack and the customer premises equipment based upon the network addresses of the data packets.

2. The computer system of claim 1, further comprising a memory device that is utilized by both the operating system and the cable modem.

3. The computer system of claim 1, wherein the cable modem is connected to a cable network.

4. The computer system of claim 1, wherein the cable modem is configured to receive data using a DOCSIS standard.

5. The computer system of claim 1, further including a buffer for storing the data packets received by the cable modem, and wherein forwarding the data packets includes acts of storing the data packets in the buffer and forwarding pointers corresponding to the data packets to the cable modem protocol stack and bridging component based upon network addresses of the data packets.

6. In a computer system that is configured to host a cable modem for receiving data packets over a cable network and to connect with customer premises equipment through a system network, a method for forwarding data packets received over the cable network to one of a cable modem protocol stack that enables communication to and from the cable modem, a computer system protocol stack that enables communication to and from the operating system of the computer system, and the customer premises equipment based upon network addresses assigned to the received data packets, the method comprising the acts of:
    receiving, at the cable modem hosted by the computer system, a data packet having a network address corresponding to one of the cable modem, the computer system and customer premises equipment configured to connect with the computer system;
    forwarding the data packet from the cable modem to a cable modem driver; and
    based upon the network address of the data packet, forwarding the data packet from the cable modem driver to one of a cable modem protocol stack and a bridging component that is included in the computer system, such that the data packet is forwarded to the cable modem protocol stack only when the network address corresponds to the cable modem and such that the data packet is forwarded to the bridging component only when the network address does not correspond to the cable modem;
    wherein the bridging component, upon a receipt of the data packet from the cable modem driver, is configured to forward the data packet the computer system protocol stack when the network address corresponds to the computer system and to forward the data packet to the customer premises equipment when the network address corresponds to the customer premises equipment.

7. The method of claim 6, wherein the act of forwarding the data packet from the cable modem comprises the acts of:
    storing the data packet in a buffer included m the computer system; and
    forwarding a pointer to the data packet from the cable modem to the bridging component.

8. The method of claim 6, wherein the act of forwarding the data packet from the cable modem to a bridging component comprises the acts of:
    resolving the address at the cable modem driver so as to identify that the cable modem is not the recipient of the data packet, and
    forwarding the data packet from the cable modem driver to the bridging component.

9. The method of claim 8, wherein the data packet is a first data packet, and wherein the address is a first address, the method further comprising the acts of:
    receiving, at the cable modem hosted by the computer system, a second data packet having a second address corresponding to the cable modem;
    resolving the second address at the cable modem driver so as to identify the cable modem as the recipient of the second data packet; and
    forwarding data included in the second data packet from the cable modem driver to a cable modem protocol stack included in the computer system.

10. The method of claim 6, wherein the data packet is a first data packet, and wherein the address is a first address, the method further comprising the acts of:
    receiving, at the cable modem hosted by the computer system, a second data packet having a second address corresponding to an item of customer premises equipment networked to the computer system;
    forwarding the second data packet from the cable modem to the bridging component included in the computer system;

resolving the second address at the bridging component so as to identify the item of customer premises equipment as a recipient of the second data packet; and forwarding data included in the second data packet from the bridging component to the item of customer premises equipment.

11. A computer program product for use in a computer system that is configured to host a cable modem for receiving data packets over a cable network and to connect with customer premises equipment through a system network, the computer program product comprising one or more computer-readable medium comprising computer-executable instructions for implementing a method for forwarding data packets received over the cable network to one of a cable modem protocol stack that enables communication to and from the cable modem a computer system protocol stack that enables communication to and from the operating system of the computer system, and the customer premises equipment based upon network addresses assigned to the received data packets, the method comprising the acts of:

receiving, at the cable modem hosted by the computer system, a data packet having a network address corresponding to one of the cable modem the computer system and customer premises equipment configured to connect with the computer system;

forwarding the data packet from the cable modem to a cable modem driver; and based upon the network address of the data packet, forwarding the data packet from the cable modem driver to one of a cable modem protocol stack and a bridging component that is included in the computer system, such that the data packet is forwarded to the cable modem protocol stack only when the network address corresponds to the cable modem and such that the data racket is forwarded to the bridging component only when the network address does not correspond to the cable modem, wherein the bridging component, upon a receipt of the data packet from the cable modem driver, is configured to forward the data packet to the computer system protocol stack when the network address corresponds to the computer system and to forward the data packet to the customer premises equipment when the network address corresponds to the customer premises equipment.

12. The computer program product as recited in claim 11, wherein the act of forwarding a data packet includes acts of:

storing the data packet in a buffer included in the computer system: and forwarding a pointer associated with the data packet to the bridging component included in the computer system.

13. The computer program product as recited in claim 11, wherein the act of forwarding a data packet to the bridging component comprises acts of:

resolving the address at the cable modem driver included in the computer system so as to identify that the cable modem is not a recipient of the data packet; and forwarding the data packet from the cable modem driver to the bridging component.

14. The computer program product as recited in claim 13, wherein the data packet is a first data packet, and wherein the address is a first address, the method further including acts of:

forwarding a second data packet received at the cable modem to the cable modem driver included in the computer system, the second data packet having a second address;

resolving the second address at the cable modem driver so as to identify the cable modem as the recipient of the second data packet; and forwarding data included in the second data packet from the cable modem driver to a cable modem protocol stack included in the computer system.

15. The computer program product as recited in claim 11, wherein the data packet is a first data packet, and wherein the address is a first address, the method further including acts of:

forwarding a second data packet received at the cable modem to a bridging component included in the computer system, the second data packet having a second address;

resolving the second address at the bridging component so as to identify the item of customer premises equipment as a recipient of the second data packet; and forwarding data included in the second data packet from the bridging component to the item of customer premises equipment.

* * * * *

UNITED STATES PATENT AND TRADEMARK OFFICE
CERTIFICATE OF CORRECTION

PATENT NO.    : 6,618,386 B1
DATED         : September 9, 2003
INVENTOR(S)   : Liu et al.

It is certified that error appears in the above-identified patent and that said Letters Patent is hereby corrected as shown below:

Column 2,
Line 14, after "speeds" please remove "of"
Line 58, after "desired" please remove "is"

Column 3,
Line 33, before "network" please remove "an" and insert -- a --

Column 6,
Line 9, after "wide-area" please remove "networks" and insert -- network --

Column 8,
Line 18, after "such" please insert -- as --
Line 57, after "as there" please remove "is,a" and insert -- is a --

Column 9,
Line 12, after "a Cable" please remove "Modern" and insert -- Modem --

Column 10,
Line 20, after "invention" please remove "the"
Line 40, after "stacks" please remove "(not shown," and insert -- (not shown) --

Column 11,
Line 30, before "having a" please insert -- a cable modem --
Line 36, after "that is" please remove "confined" and insert -- configured --
Line 40, after "packets" please insert -- , --

Column 12,
Line 22, after "modem" please remove ";" and insert -- , --
Line 25, after "packet" please insert -- to --
Line 33, after "included" please remove "m" and insert -- in --.

UNITED STATES PATENT AND TRADEMARK OFFICE
CERTIFICATE OF CORRECTION

PATENT NO. : 6,618,386 B1
DATED : September 9, 2003
INVENTOR(S) : Liu et al.

It is certified that error appears in the above-identified patent and that said Letters Patent is hereby corrected as shown below:

Column 13,
Line 24, after "modem" please insert -- , --
Line 36, after "the data" please remove "racket" and insert -- packet --

Signed and Sealed this

Twenty-second Day of June, 2004

JON W. DUDAS
*Acting Director of the United States Patent and Trademark Office*